United States Patent [19]

Sugo et al.

[11] Patent Number: 4,485,791
[45] Date of Patent: Dec. 4, 1984

[54] METHOD OF OPERATING A SINGLE SPOT FUEL INJECTED INTERNAL COMBUSTION ENGINE AND APPARATUS FOR SAME

[75] Inventors: Yuko Sugo; Tadahiro Yamamoto; Motomi Arai; Masaaki Saito, all of Yokosuka, Japan

[73] Assignee: Nissan Motor Co., Ltd., Yokohama, Japan

[21] Appl. No.: 190,295

[22] Filed: Sep. 24, 1980

[30] Foreign Application Priority Data

Sep. 25, 1979 [JP] Japan .......................... 54/132153[U]

[51] Int. Cl.³ .................................................. F02B 3/00
[52] U.S. Cl. .................................. 123/478; 123/501; 123/472; 123/490
[58] Field of Search ............... 123/502, 501, 490, 478, 123/472, 445

[56] References Cited

U.S. PATENT DOCUMENTS

| | | | |
|---|---|---|---|
| 2,745,349 | 5/1956 | Tavola | 417/506 |
| 3,267,921 | 8/1968 | Whitehurst | 123/445 |
| 4,132,203 | 1/1979 | Elpern | 123/478 |
| 4,153,014 | 5/1979 | Sweet | 123/478 |
| 4,204,507 | 5/1980 | Casey | 123/478 |
| 4,235,205 | 11/1980 | Fukui et al. | 123/472 |
| 4,301,780 | 11/1981 | Hoshi | 123/478 |

FOREIGN PATENT DOCUMENTS

| | | | |
|---|---|---|---|
| 1206539 | 2/1960 | France | 123/478 |
| 2355164 | 1/1978 | France | 123/478 |
| 2384121 | 10/1978 | France | 123/478 |
| 2431610 | 2/1980 | France | 123/478 |
| 1434844 | 5/1976 | United Kingdom | 123/478 |
| 2014655 | 8/1979 | United Kingdom | 123/478 |

Primary Examiner—Ronald B. Cox
Attorney, Agent, or Firm—Schwartz, Jeffery, Schwaab, Mack, Blumenthal & Koch

[57] ABSTRACT

A single spot fuel injector is energized only twice per revolution of the crankshaft of the engine so that under given operating conditions the injections coincide with the TDC and BDC positions of a piston of a selected cylinder of the engine. Under higher engine speed operation, the injection timing is advanced to improve the fuel distribution to the cylinders. When the engine operates at an engine speed below a predetermined level it is possible for the injector to be energized three times per revolution of the crankshaft.

6 Claims, 6 Drawing Figures

METHOD OF OPERATING A SINGLE SPOT FUEL INJECTED INTERNAL COMBUSTION ENGINE AND APPARATUS FOR SAME

BACKGROUND OF THE INVENTION

1. Field of the Invention

The present invention relates generally to a fuel injected multi-cylinder internal combustion engine, and more particularly to a single spot type fuel injected engine wherein the air-fuel distribution to the cylinders is improved by energizing the fuel injector twice per revolution of the crankshaft.

2. Description of the Prior Art

In prior art single spot injection arrangements fuel has been injected either once or three times per revolution of the engine crankshaft. However these methods have suffered from the drawbacks that the single injection fails to provide an adequate fuel distribution while in the case of three injections per revolution, the fuel distribution at low engine speeds is good, but as the engine speed is increased the frequency with which the injector must be energized exceeds the limit wherein the desired fuel injection and the actual injection fail to coincide, resulting in a marked deterioration in engine control. When the engine speed is 6000 RPM, the frequency of actuation of the injector is approximately 300 Hz (as compared with 100 Hz at lower engine speeds). At this speed, the correspondence between the pulse width and the amount of fuel injected in response to that particular pulse width loses its linearity.

SUMMARY OF THE INVENTION

The present invention features a method of operating a multi-cylinder internal combustion engine having a single spot type fuel injector which is (a single fuel injector placed upstream of the engine cylinders and which produces the air-fuel mixture for all said cylinders) which is energized to inject fuel twice per revolution of the engine crankshaft. The injection trigger pulses are basically timed to coincide with the TDC and the BDC positions of a selected cylinder and are preferably varied from that timing in response to various engine operating parameters, such as high speed operation, to improve the fuel distribution to the cylinders. Further according to the present invention the number of injections per revolution can be increased to three when the engine operates at relatively low engine speeds.

BRIEF DESCRIPTION OF THE DRAWINGS

The features and advantages of the method and apparatus according to the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 1:
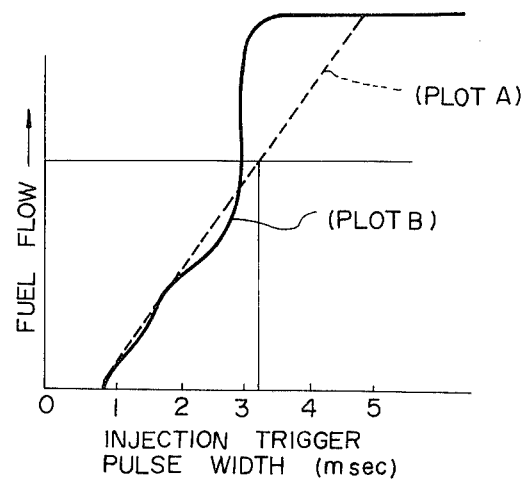
FIG. 1 is a graph showing, in terms of fuel flow and injection pulse duration, the fuel flow characteristics provided by the three injection method at low RPM (broken line) and at high RPM (solid line)

Prior to a detailed description of the present invention it is deemed advantageous to discuss FIG. 1, wherein the drawback of the three injection per revolution prior art arrangement is shown graphically. Plot A (broken line) shows the injectors' mechanical ability to maintain a linear relationship between the pulse width of the energization or trigger signal and the amount of fuel released from the injector. However, as shown by plot B (solid line), after exceeding a given RPM, the correspondence between the pulse width and the amount of fuel released by the injector rapidly loses its linear relationship, resulting in deterioration of fuel distribution to the engine cylinders.

Figure 2:
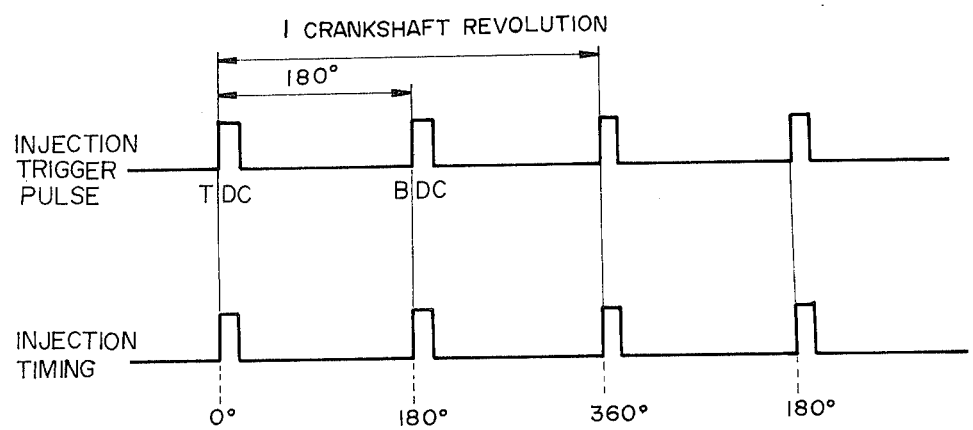
FIG. 2 is a chart showing the injection trigger pulses and the resultant basic injection timing according to the present invention.

FIG. 2 shows a chart of the production of two equidistantly spaced injection trigger pulses per single revolution of the crankshaft and (therebelow) the resulting injection timing as per the present invention.

Figure 3:
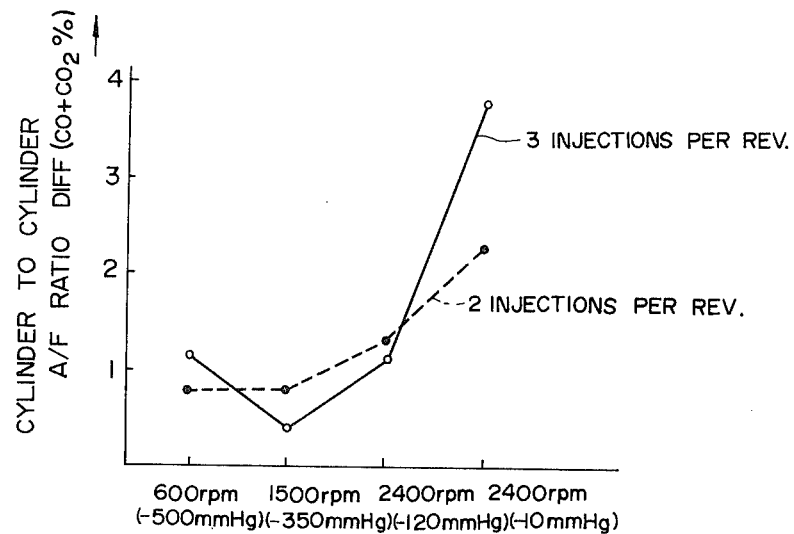
FIG. 3 is a graph comparing the fuel distribution between the cylinders of an engine when using three injections per revolution (solid line) and two injections per revolution (broken line)

FIG. 3 is a graph comparing the fuel distribution between the engine cylinders when using the prior art three injection technique and that achieved with the two injection method of the present invention. As shown, this graph sets forth, on the ordinate thereof, the cylinder-to-cylinder A/F ratio difference (detected in terms of exhaust gas CO and $CO_2$ content), and on the abscissa, various engine operating conditions expressed in terms of engine rotational speed at given induction manifold vacuum levels. In connection with the ordinate calibration, it has been empirically determined that the percentage of carbon monoxide plus the percentage of carbon dioxide in the exhaust gases closely approximates the air-fuel ratio of the mixture combusted in the engine cylinders. Accordingly, the exhaust gases have been analyzed for CO and $CO_2$ content, and the numerical difference between the highest and lowest air fuel ratios plotted on the ordinate. It goes without saying that a zero difference is the end result sought but, as shown, this is not possible, although it may be closely approximated under given engine operating conditions.

In FIG. 3, the solid line indicates the fuel distribution using the three injection technique and the broken line indicates the distribution provided using the two injection technique according to the present invention. Although the solid line plot at one stage is lower than the broken line plot, at each end thereof the three injection technique yields a poorer fuel distribution than the two injection technique. The poorer distribution is particularly noticable at the higher RPM-high load end of the graph.

Figure 4:
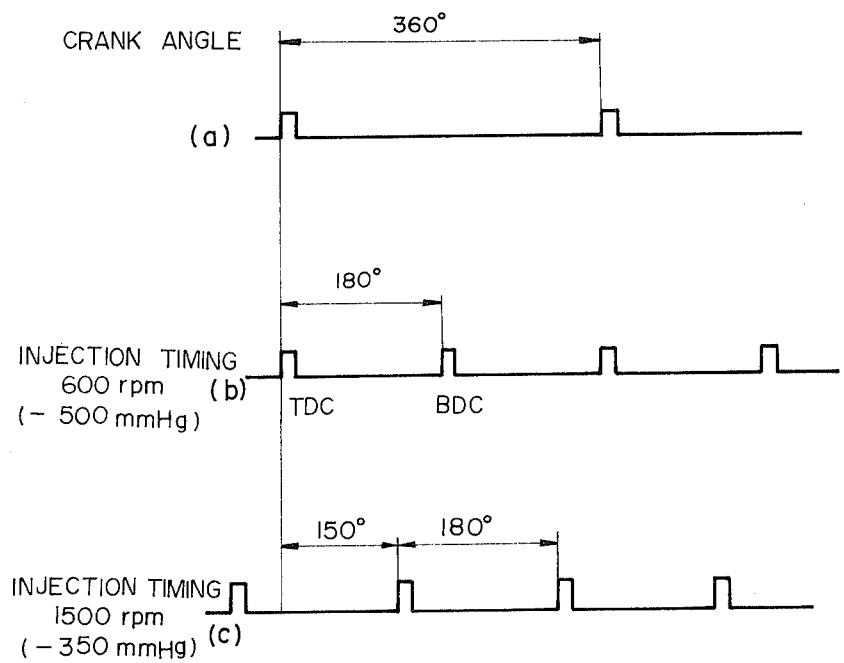
FIG. 4 is a chart showing the variations of injection timing between different engine operating conditions according to a further aspect of the present invention.

In order to further improve the fuel distribution, it is proposed according to the present invention, to vary the injection timing of the two injections, as illustrated in FIG. 4. FIG. 4(a) indicates an electronic pulse once every rotation of the crank shaft. FIG. 4(b) indicates the injection timing used when the engine is operating at very low engine speeds (viz. idling), one injection pulse every 180 degrees. FIG. 4(c) indicates a possible timing advance of 30 degrees with respect to the FIG. 4(b) conditions, i.e., when the engine is operated at 1500 RPM with an induction vacuum of −350 mmHg.

Figure 5:
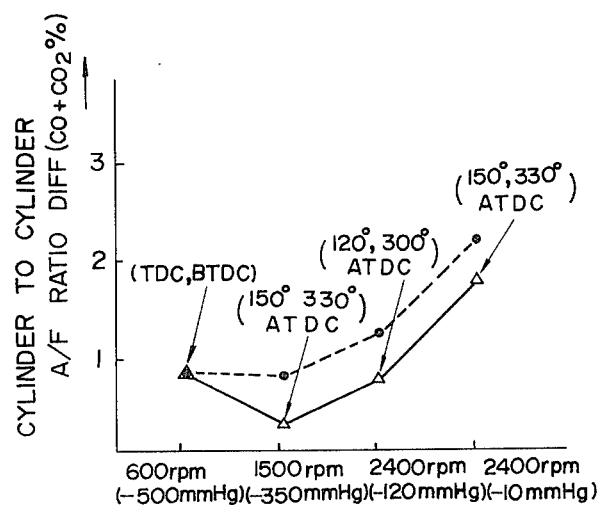
FIG. 5 is a graph comparing the two injections per revolution fuel distribution between the engine cylinders when using a basic injection timing and a timing 30 degrees advanced with respect to the basic timing.

FIG. 5 is a graph similar to FIG. 3 but showing the difference in fuel distribution achieved by the basic two injection timing (viz. injection at TDC and BDC of a selected cylinder) and the above-mentioned advanced injection. As can be seen from the this graph, a notable improvement in fuel distribution is achieved by advancing the injection, which improvement unexpectedly exceeds the best distribution achieved by the three injection method.

Figure 6:
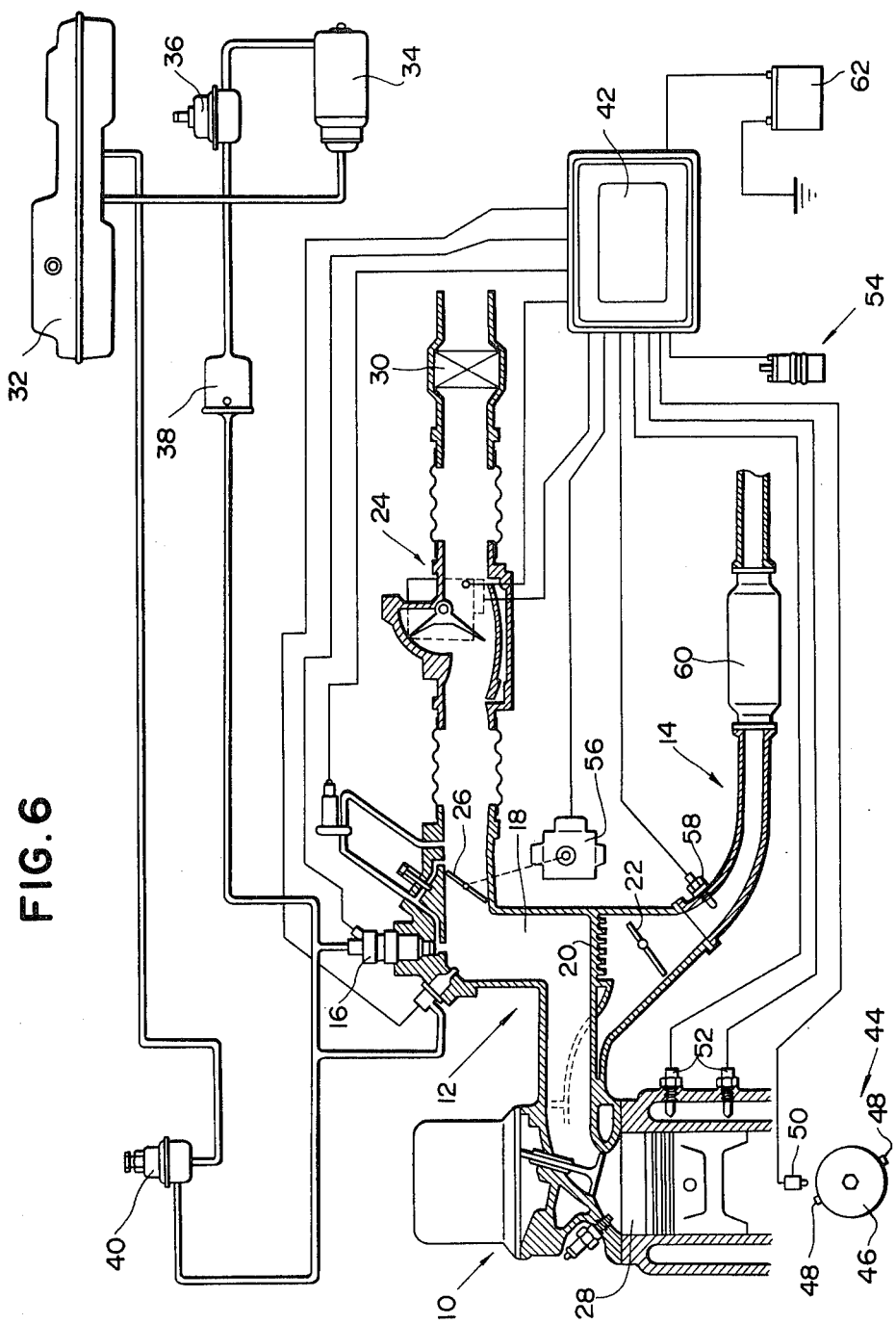
FIG. 6 is a diagrammatic layout of a preferred apparatus for executing the method of the present invention.

FIG. 6 is a diagrammatic layout of an apparatus suitable for carrying out the method of the present invention. In this figure the numeral 10 denotes an internal combustion engine having an induction system 12 and an exhaust system 14. A single spot fuel injector 16 is disposed in the induction system and oriented is to inject fuel toward the bottom 20 of a riser 18 defined in the induction system. The bottom 20 of the riser 18 is heated by the exhaust gases flowing through the exhaust system 14. A thermostatically controlled valve member 22 is disposed in the exhaust system for controllably deflecting the exhaust gases against the riser bottom 20.

An air-flow meter 24 is disposed in the induction system 12 for sensing the air flow therethrough. A throttle valve 26 is disposed downstream of the air flow meter for controlling the air flow to the engine cylinders 28 (only one is shown). An air cleaner 30 is disposed upstream of the air-flow meter for removing dust and the like from the air prior to entry into the induction system.

The fuel injector 16 is supplied with fuel under pressure from a system including an injector pump 34, a fuel pressure damper 36, a fuel filter 38, and a fuel pressure regulator 40. This system is, of course, one of a number of well known systems and, as such, no further description will be given for the sake of brevity.

The fuel injector 16 is controlled by a central control circuit 42 which is fed various engine operational data from various sensors. These sensors include the air-flow meter 24 and a crankshaft rotation or angular displacement sensor 44. The crankshaft angular displacement sensor includes a rotatable disc 46 having two indicators 48 thereon (the indicators in this case are spaced 180 degrees apart). The disc 46 is operatively connected to the engine crankshaft (not shown) for synchronous rotation therewith. Stationarily mounted adjacent the disc is a pick up 50 which outputs a signal each time one of the indicators passes by. The control circuit is further fed information from an engine coolant sensor or sensors 52 which are exposed to the engine coolant (which in this case is a liquid), from the engine ignition system 54, from a throttle valve angular position sensor 56, and from an oxygen sensor 58 or the like disposed in the exhaust system upstream of a catalytic converter 60, which in the preferred embodiment is a three way type. The control unit 42 is energized by connection to a source of EMF such as the battery 62.

Thus, with the above described arrangement, it is possible to energize the fuel injector 16 to inject fuel according to a schedule which corresponds to the TDC and the BDC positions of a selected piston, and to further, upon being given operational parameters, advance the injection timing suitably to take full advantage of the increased rate of air flowing through the injection system (such as occurs at medium to high engine RPM operating conditions).

It will be further appreciated that with the above described apparatus it is possible to increase the number of injections per revolution, based on the engine speed and other operating parameters, such as throttle valve opening, air flow and ignition timing signals indicating a sufficiently low engine speed.

Thus, in summary, the method and apparatus of the present invention preferably engerize a fuel injector to inject fuel twice per revolution of the crankshaft of the engine and advance the basic injection timing (which corresponds to TDC and BDC of a selected piston to take advantage of the reduced time required for the air flow from the air flow meter to the engine cylinders during medium to high engine speed operation, and accordingly improve the fuel distribution to the cylinders (as is indicated in FIG. 5 of the drawings).

What is claimed is:

1. A method of operating a six cylinder internal combustion engine having a crankshaft, comprising the steps of:
   forming an air-fuel mixture for said six cylinder engine using a single fuel injector;
   detecting angular displacement of said crankshaft;
   producing two fuel injection trigger pulses per crankshaft revolution for causing said single fuel injector to inject fuel twice per crankshaft revolution;
   timing the output of said trigger pulses to correspond to the TDC and BDC positions of a piston of a selected one of said six cylinders;
   detecting at least one operating parameter indicative of engine speed;
and
   variably advancing the initiation of said trigger pulses according to said engine speed whereby the onset of each of said fuel injections is variably advanced according to said engine speed.

2. A method of operating a six-cylinder internal combustion engine having a crankshaft, comprising the steps of:
   using a single fuel injector for forming the air-fuel mixture fed to the cylinders of said engine;
   detecting the angular displacement of said crankshaft of said engine;
   producing two fuel injection trigger pulses per single revolution of said crankshaft;
   timing the output of said trigger pulses to said injector so as to correspond to the TDC and BDC positions of a piston of a selected one of said cylinders;
   detecting various operating parameters of said engine;
   variably advancing the initiation of said trigger pulses in response to the detection of said engine operating parameters indicating increasing engine speed; and
   producing three trigger pulses per single revolution of said crankshaft when the revolution speed of said crankshaft is below a predetermined level.

3. In a six cylinder internal combustion engine having a crankshaft, a fuel injection apparatus comprising:
   a single fuel injector for forming an air-fuel mixture fed to the cylinders;
   means for detecting the angular displacement of said crankshaft;

a control unit responsive to said detecting means for producing two fuel injection trigger pulses per single revolution of said crankshaft;

said control unit being adapted to issue said trigger pulses in correspondence with the TDC and BDC positions of a piston of a selected one of said cylinders;

and means responsive to operating parameters of said engine for outputting data signals to said control unit for varying the initiation timing of said trigger pulses with respect to said TDC and BDC positions of said piston and for producing three injection trigger pulses per single revolution of said crankshaft when said means responsive to the operating parameters of said engine indicates that the engine rotational speed is below a predetermined level.

4. In a six cylinder internal combustion engine having a crankshaft, a fuel injection apparatus comprising:

a single fuel injector for forming an air-fuel mixture for said six cylinders;

first means for detecting the angular displacement of said crankshaft;

second means for detecting at least one operating parameter of the engine indicative of engine speed;

a control unit, responsive to said first and second detecting means for producing two fuel injection trigger pulses per crankshaft revolution, said trigger pulses being variably timed with respect to TDC and BDC positions of a piston of a selected one of said six cylinders so as to cause said single fuel injector to inject fuel twice per crankshaft revolution, said variable timing being a function of the engine speed.

5. A method of operating a multi-cylinder internal combustion engine having a crankshaft, comprising the steps of:

using a single fuel injector for forming the air-fuel mixture fed to said multiple cylinders of said engine;

detecting the angular displacement of said crankshaft of said engine;

producing two fuel injection trigger pulses per single revolution of said crankshaft;

timing the output of said trigger pulses to said injector so as to correspond to the TDC and BDC positions of a piston of a selected one of said multiple cylinders;

detecting various operating parameters of said engine;

variably advancing the initiation of said trigger pulses in response to the detection of said engine operating parameters indicating increasing engine speed; and producing three trigger pulses per single revolution of said crankshaft when the revolution speed of said crankshaft is below a predetermined level.

6. In a multi-cylinder internal combustion engine having a crankshaft, a fuel injection apparatus comprising:

a single fuel injector for forming an air-fuel mixture fed to said multiple cylinders;

means for detecting the angular displacement of said crankshaft;

a control unit responsive to said detecting means for producing two fuel injection trigger pulses per single revolution of said crankshaft;

said control unit being adapted to issue said trigger pulses in correspondence with the TDC and BDC positions of a piston of a selected one of said multiple cylinders; and means responsive to operating parameters of said engine for outputting data signals to said control unit for varying the initiation timing of said trigger pulses with respect to said TDC and BDC positions of said piston and for producing three injection trigger pulses per single revolution of said crankshaft when said means responsive to the operating parameters of said engine indicates that the engine rotational speed is below a predetermined level.

* * * * *